US009273210B2

(12) United States Patent
Schrinner et al.

(10) Patent No.: US 9,273,210 B2
(45) Date of Patent: Mar. 1, 2016

(54) USE OF AN AQUEOUS PREPARATION FOR THE COATING OF WOOD SURFACES TO ACHIEVE A NATURAL-TOUCH EFFECT

(75) Inventors: Marc Claudius Schrinner, Shanghai (CN); Christoph Irle, Leverkusen (DE); Martin Melchiors, Leichlingen (DE); Maria Almato Guiteras, Köln (DE); Eva Tejada, Mollet del Vallès (ES)

(73) Assignee: Covestro Deutschland AG, Leverkusen (DE)

( * ) Notice: Subject to any disclaimer, the term of this patent is extended or adjusted under 35 U.S.C. 154(b) by 47 days.

(21) Appl. No.: 14/008,005

(22) PCT Filed: Mar. 23, 2012

(86) PCT No.: PCT/EP2012/055232
§ 371 (c)(1),
(2), (4) Date: Nov. 13, 2013

(87) PCT Pub. No.: WO2012/130765
PCT Pub. Date: Oct. 4, 2012

(65) Prior Publication Data
US 2014/0057120 A1    Feb. 27, 2014

(30) Foreign Application Priority Data
Mar. 29, 2011  (EP) .................................... 11160116

(51) Int. Cl.
| C09D 5/00 | (2006.01) |
| B27K 3/15 | (2006.01) |
| B05D 1/02 | (2006.01) |
| B05D 1/18 | (2006.01) |
| C08G 18/08 | (2006.01) |
| C08G 18/44 | (2006.01) |
| C08G 18/62 | (2006.01) |
| C08G 18/70 | (2006.01) |
| C09D 175/04 | (2006.01) |
| C08L 75/04 | (2006.01) |

(52) U.S. Cl.
CPC . *C09D 5/00* (2013.01); *B27K 3/153* (2013.01); *C08G 18/0823* (2013.01); *C08G 18/44* (2013.01); *C08G 18/6229* (2013.01); *C08G 18/6254* (2013.01); *C08G 18/706* (2013.01); *C09D 175/04* (2013.01); *C08L 75/04* (2013.01); *Y10T 428/662* (2015.04)

(58) Field of Classification Search
CPC .............. C08G 18/0823; C08G 18/44; C08G 18/6229; C08G 18/6254; C08G 18/706; C09D 5/00; C09D 175/04; C08L 75/04; C08L 2666/20; Y10T 428/662; B27K 3/153
USPC ................... 428/425.1, 541; 427/201, 213.33, 427/213.34, 427.4, 440
See application file for complete search history.

(56) References Cited

U.S. PATENT DOCUMENTS

| 4,108,814 | A | 8/1978 | Reiff et al. |
| 5,252,696 | A | 10/1993 | Laas et al. |
| 6,559,225 | B1 | 5/2003 | Irle et al. |
| 7,060,778 | B2 | 6/2006 | Hofacker |
| 2003/0009047 | A1 | 1/2003 | Tillack et al. |
| 2003/0191273 | A1 | 10/2003 | Gertzmann et al. |
| 2004/0034162 | A1 | 2/2004 | Laas et al. |
| 2004/0167252 | A1 | 8/2004 | Melchiors et al. |
| 2004/0220326 | A1* | 11/2004 | Gurtler et al. ................. 524/589 |
| 2006/0078745 | A1 | 4/2006 | Pudleiner et al. |
| 2006/0079635 | A1* | 4/2006 | Pohl et al. ...................... 524/589 |
| 2006/0241228 | A1 | 10/2006 | Gertzmann et al. |
| 2006/0293468 | A1 | 12/2006 | Rische et al. |
| 2007/0059530 | A1 | 3/2007 | Ziegler et al. |
| 2007/0238830 | A1 | 10/2007 | Gertzmann et al. |
| 2008/0045641 | A1* | 2/2008 | Dorr et al. ..................... 524/457 |

FOREIGN PATENT DOCUMENTS

| CA | 2253119 A1 | 5/1999 |
| DE | 2446440 A1 | 4/1976 |
| DE | 10007821 A1 | 8/2001 |
| DE | 10024624 A1 | 11/2001 |
| EP | 0 540 985 A1 | 5/1993 |
| EP | 916647 A2 | 5/1999 |
| EP | 0 959 087 A1 | 11/1999 |
| EP | 1350824 A1 | 10/2003 |
| EP | 1404740 A2 | 4/2004 |
| EP | 1477508 A1 | 11/2004 |
| EP | 1717284 A1 | 11/2006 |
| EP | 1736490 A2 | 12/2006 |
| EP | 1845120 A1 | 10/2007 |
| WO | WO-01/02455 A1 | 1/2001 |
| WO | WO-01/88006 A1 | 11/2001 |

OTHER PUBLICATIONS

International Search Report for PCT/EP2012/055232 mailed Jul. 12, 2012.

* cited by examiner

Primary Examiner — Thao T Tran
(74) Attorney, Agent, or Firm — Drinker Biddle & Reath LLP

(57) ABSTRACT

The present invention relates to the use of an aqueous preparation for the coating of wood surfaces, characterized in that the aqueous preparation comprises: a hydroxyl-functional polyurethane-polyacrylate dispersion, a polyurethane dispersion, an at least partially hydrophilicized polyisocyanate and ≥0 weight-% to ≤10 weight-% of a matting agent, wherein the combined hydroxyl content of the hydroxyl-functional polyacrylate dispersion and the polyurethane dispersion is ≥1% to ≤12%. The invention further relates to a method of producing a coated wood surface, comprising the step of coating a wood surface with such an aqueous preparation and to a coated wood surface comprising an aqueous preparation whose use has been recited in the context of the use according to the invention.

10 Claims, No Drawings

USE OF AN AQUEOUS PREPARATION FOR THE COATING OF WOOD SURFACES TO ACHIEVE A NATURAL-TOUCH EFFECT

RELATED APPLICATIONS

This application is a national stage application (under 35 U.S.C. §371) of PCT/EP2012/055232, filed Mar. 23, 2012, which claims benefit of European Application No. 11160116.7, filed Mar. 29, 2011, which is incorporated by reference herein.

The present invention relates to the use of an aqueous preparation comprising a polyurethane-polyacrylate dispersion, a polyurethane dispersion and a polyisocyanate for the coating of wood surfaces to achieve a natural-touch effect. The invention further relates to a method of producing a coated wood surface, comprising the step of coating a wood surface with such an aqueous preparation and to a coated wood surface comprising an aqueous preparation whose use has been recited in the context of the use according to the invention.

Aqueous coating compositions are increasingly being used instead of systems containing solvent with the objective of reducing emissions of organic solvents. Polyurethane dispersions comprise one important class of aqueous lacquer binders. D. Dieterich provides an overview in Prog. Org. Coatings 9, 281 (1981). Polyurethane dispersions combine the important properties of resistance to chemicals and mechanical stress. It is thus advantageous to use polyurethane dispersions, especially for coating surfaces exposed to severe mechanical stress.

Polyurethane dispersions for coating wood are well known in the art. Examples include those described in WO 01/02455 A1, EP 1 845 120 A1, EP 1 350 824 A1 and EP 1 717 284 A1. US 2006/0293468 A1 provides aqueous coating materials. The materials comprise I) hydroxyl-free polyurethanes and/or polyurethane-ureas, II) ionically modified, hydroxyl-containing polyurethanes and/or polyurethane-ureas, and III) at least one crosslinker, characterized in that the components (I) and (II) comprise polycarbonate polyols which have at least 25% by weight of 1,4-butanediol as synthesis component. A process for preparing the coating materials, and their use as soft feel paint, is also provided.

Polyurethane-polyacrylate dispersions are for example described in US 2004/0167252 A1 which relates to aqueous polyurethane (PU)-polyacrylate (PAC) hybrid secondary dispersions and the aqueous two-component (2K) coating compositions produced therefrom, a process for their preparation and use. A process for producing coatings described therein comprises applying these polyurethane-polyacrylate hybrid secondary dispersions to substrates selected from the group consisting of concrete, screeding, mineral surfaces, wood, wood-based materials, metal, asphalt-containing or bituminous coverings, plastics surfaces, glass, glass fibers, carbon fibers, woven and non-woven textiles, leather, paper, hard fibers or straw and dried.

When wood is provided with a coating the haptic impression that a person touching the coated wood surface experiences may change. In particular, the wood surface may feel artificial and "plastic-like". This is unwelcome as it may lead to a decreased acceptance of the article, in particular if the article is a piece of furniture or a wooden floor covering. It would therefore be desirable to be able to coat such wooden objects of daily use in such a manner that one still has the impression of touching a natural wood surface without compromising other aspects of usability.

The present invention has the object of providing such a coating. Accordingly, this object has been achieved by the use of an aqueous preparation for the coating of wood surfaces, characterized in that the aqueous preparation comprises:
- a hydroxyl-functional polyurethane-polyacrylate dispersion,
- a polyurethane dispersion,
- an at least partially hydrophilicized polyisocyanate and
- ≥0 weight-% to ≤10 weight-% of a matting agent, wherein the combined hydroxyl content of the hydroxyl-functional polyurethane-polyacrylate dispersion and the polyurethane dispersion is ≥1% to ≤12%.

In another embodiment the presently claimed invention relates to an aqueous preparation that comprises:
- ≥20 weight-% to ≤50 weight-% a hydroxyl-functional polyurethane-polyacrylate dispersion,
- ≥20 weight-% to ≤50 weight-% a polyurethane dispersion,
- ≥5 weight-% to ≤20 weight-% an at least partially hydrophilicized polyisocyanate and
- ≥0 weight-% to ≤10 weight-% of a matting agent, wherein the combined hydroxyl content of the hydroxyl-functional polyacrylate dispersion and the polyurethane dispersion is ≥1% to ≤12%.

In another embodiment the presently claimed invention relates to an aqueous preparation that comprises:
- ≥20 weight-% to ≤50 weight-% a hydroxyl-functional polyurethane-polyacrylate dispersion,
- ≥20 weight-% to ≤50 weight-% a polyurethane dispersion,
- ≥5 weight-% to ≤20 weight-% an at least partially hydrophilicized polyisocyanate and
- ≥0 weight-% to ≤10 weight-% of a matting agent,
- ≥0 weight-% to ≤15 weight-% auxiliaries and additives selected from the group consisting of defoamers, wetting agents, thickeners, pigments, dispersing assistants, catalysts, anti-skinning agents, anti-settling agents and emulsifiers, wherein the combined hydroxyl content of the hydroxyl-functional polyacrylate dispersion and the polyurethane dispersion is ≥1% to ≤12%.

A preferred range is ≥20 weight-% to ≤40 weight-% of a hydroxyl-functional polyurethane-polyacrylate dispersion and more preferred 25 weight-% to ≤35 weight-% of a hydroxyl-functional polyurethane-polyacrylate dispersion.

A preferred range is ≥20 weight-% to ≤40 weight-% of a polyurethane dispersion.

A preferred range is ≥10 weight-% to ≤20 weight-% of an at least partially hydrophilicized polyisocyanate.

A preferred range is ≥1 weight-% to ≤10 weight-% of a matting agent and more preferred ≥2 weight-% to ≤7 weight-% of a matting agent.

A preferred range is ≥2 weight-% to ≤14 weight-% of auxiliaries and additives selected from the group consisting of defoamers, wetting agents, thickeners, pigments, dispersing assistants, catalysts, anti-skinning agents, anti-settling agents and emulsifiers.

The combination of polymer dispersions according to the invention may impart a natural-touch feeling to wood surfaces while at the same time it offers a good combination of black heel mark resistance, dirt pick-up resistance and abrasion resistance. Hence the use of the afore-mentioned preparation is a use for the coating of wood surfaces, wherein the coated wood surface has a natural-touch feeling.

In the aqueous preparation the combined hydroxyl content of the hydroxyl-functional polyurethane-polyacrylate dispersion and the polyurethane dispersion is to be understood as the calculated content of OH groups, expressed in weight-%, of the dry polyurethane-polyacrylate and polyurethane polymers before OH group consuming reactions take place. The OH content of the solvents and in particular water is not included. The calculation of the OH content is based on the stoichiometries of the reactions for producing the polyurethane-polyacrylate and the polyurethane polymers. Preferred values for the hydroxyl content are ≥1% to ≤10% and more preferred values are ≥1% to ≤5%.

The hydroxyl-functional polyurethane-polyacrylate dispersion can be obtained by carrying out, in the presence for example of a polyurethane dispersion, a free-radically initiated emulsion polymerization of (meth)acrylic esters, (meth)acrylic acid, hydroxyalkyl (meth)acrylates, styrene and, if desired, other monomers. In the course of the polymerization there may be grafting reactions onto the polyurethane. It is also possible, by incorporation of unsaturated compounds into the polyurethane, for example, to carry out specifically grafting reactions and also copolymerization reactions between polyurethane and polyacrylate.

It is also possible to prepare the polyurethane in the presence of unsaturated monomers such as styrene, butyl acrylate and/or methyl methacrylate, for example, and to carry out polymerization of the monomers after the dispersing operation. Likewise, it is also possible to prepare the polyurethane-polyacrylate hybrid dispersions as a secondary dispersion. Secondary dispersions are those aqueous dispersions which are first polymerized in a homogeneous organic medium and then redispersed in an aqueous medium with neutralization, generally without the addition of external emulsifiers.

The polyurethane dispersion may be a dispersion of a hydroxyl-functional polyurethane and/or a non-hydroxyl-functional polyurethane. It is preferred that the polyurethane dispersion comprises a hydroxyl-functional polyurethane and more preferred that this dispersion is a hydroxyl-functional polyurethane dispersion without the presence of non-hydroxyl-functional polyurethanes. With respect to UV stability, aliphatic polyurethanes are preferred for the dispersion.

Examples for matting agents, whose presence is optional, include silica particles.

The at least partially hydrophilicized polyisocyanate has two or more NCO groups per molecule and are based for example on isophorone diisocyanate, hexamethylene diisocyanate, 1,4-diisocyanatocyclohexane, bis(4-isocyanatocyclohexane)methane, 1,3-diisocyanatobenzene, triisocyanatononane or the isomeric 2,4- and 2,6-TDI, and may further contain urethane, isocyanurate and/or biuret groups. Optionally the polyisocyanates may also be blocked.

Particular preference is given to the use of low-viscosity polyisocyanates of the abovementioned kind, based on aliphatic or cycloaliphatic isocyanates.

The polyisocyanates used as crosslinkers generally have a viscosity at 23° C. of 10 to 5000 mPas according to DIN EN ISO 3219 and may also be employed, if desired in order to adjust viscosity, in a blend with small amounts of inert solvents.

The copolymers of the invention are generally hydrophilic enough that even hydrophobic crosslinker resins can be dispersed without additional emulsifiers. However, this is not to rule out the use of external emulsifiers.

Water-soluble or dispersible polyisocyanates are obtainable for example by modification of carboxylate, sulphonate and/or polyethylene oxide groups and/or polyethylene oxide/polypropylene oxide groups. The polyisocyanates can be made hydrophilic by means for example of reaction with substoichiometric amounts of monohydric, hydrophilic polyether alcohols. The preparation of hydrophilicized polyisocyanates of this kind is described for example in EP 0 540 985 A1 (p. 3, 1.55 to p. 4, 1.5). Also highly suitable are the polyisocyanates containing allophanate groups that are described in EP 959 087 A1 (p. 3, 1.39 to 51), which are prepared by reacting low-monomer-content polyisocyanates with polyethylene oxide polyether alcohols under allophanatization conditions. Also suitable are the water-dispersible polyisocyanate mixtures described in DE 100 078 21 A1 (p. 2, 1.66 to p. 31.5), which are based on triisocyanatononane Of particular suitability and preference are polyisocyanates hydrophilicized with ionic groups, especially sulphonate groups, of the kind described in DE 100 24 624 A1 (p. 3 11.13 to 33), for example.

Also possible in principle, of course, is the use of mixtures of different crosslinker resins.

The ratio of the hydroxyl groups of the binder component to the isocyanate groups of the crosslinker is typically 3:1 to 1:5, preferably 2:1 to 1:3 and with particular preference 1:1 to 1:2.

The coating preparations can be used as they are or in combination with further auxiliaries and adjuvants known from coating technology, such as fillers and pigments, for example. They can be applied in known ways, such as by spreading, pouring, knifecoating, injecting, spraying, spincoating, rolling or dipping, for example.

The present invention will be further described in connection with various embodiments. They may be combined freely unless the context clearly indicates otherwise. Even when not explicitly mentioned, OH numbers as set forth below are determined according to DIN 53240/2 and acid numbers are determined according to DIN 53402.

The molecular weight ($M_n$, $M_w$) is determined by means of gel permeation chromatography (GPC).

The samples were characterized in tetrahydrofuran eluent in accordance with DIN 55672-1. $M_n$ (UV)=number-average molar weight (GPC, UV detection), result in g/mol $M_w$ (UV)=mass-average molar weight (GPC, UV detection), result in g/mol In one embodiment of the use according to the invention the hydroxyl-functional polyurethane-polyacrylate dispersion is a polyurethane-polyacrylate hybrid secondary dispersion prepared by a process comprising:

preparing a polyurethane (A) having an average molecular weight $M_w$ of ≥1100 g/mol to ≤10000 g/mol, which contains no polymerizable double bonds, in non-aqueous solution, in the presence where appropriate of vinylically unsaturated monomers which carry no groups that are reactive towards isocyanate groups, adding to the polyurethane solution (A), one or more vinylically unsaturated monomers (B) selected from at least one of the group containing (B1) acid-functional monomers, (B2) hydroxyl- and/or amino-functional monomers, (B3) other monomers different from (B1) and (B2), and subjecting the resultant mixture to free-radical polymerization in a homogeneous, non-aqueous phase to provide a hybrid polymer, neutralizing at least some of the neutralizable groups, and dispersing the hybrid polymer into the aqueous phase, wherein the neutralization can take place before or after the vinyl polymerization or during the dispersing step.

Preferably the polyurethane (A) is obtained by reacting (A1) polyisocyanates with at least one compound containing NCO-reactive groups, selected from the group containing (A2) polyols and/or polyamines having an average molecular weight $M_n$ of ≥400 g/mol, (A3) compounds containing at least one ionic or potentially ionic group and at least one further isocyanate-reactive group and/or nonionically hydrophilicizing compounds containing at least one further isocyanate-reactive group, (A4) low molecular mass compounds having a molecular weight $M_n$ of ≤400 g/mol which are different from (A2), (A3) and (A5) and contain at least two NCO-reactive groups, (A5) compounds which are monofunctional or contain active hydrogen of different reactivity, these building blocks being located in each case at the chain end of the polymer containing urethane groups.

It is further preferred that in the process for preparing the polyurethane-polyacrylate hybrid secondary dispersion the free-radical polymerization is conducted such that at the end the fraction of the acid-functional monomers in the monomer mixture is higher than at the beginning It is also preferred that the polyurethane-polyacrylate hybrid polymer contains hydroxyl groups both in the polyurethane fraction (A) and in the vinylically unsaturated monomers fraction (B).

Examples of polyisocyanates suitable as component (A1) include diisocyanates of the molecular weight range from 140 to 400 containing aliphatically, cycloaliphatically, araliphatically and/or aromatically bonded isocyanate groups, such as 1,4-diisocyanatobutane, 1,6-diisocyanatohexane (HDI), 2-methyl-1,5-diisocyanatopentane, 1,5-diisocyanato-2,2-dimethylpentane, 2,2,4- and/or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4 (3) isocyanatomethylcyclohexane, bis(isocyanatomethyl)norbornane, 1,3- and 1,4-bis(2-isocyanatoprop-2-yl)benzene (TMXDI), 2,4- and 2,6-diisocyanato-toulene (TDI), 2,4'- and 4,4'-diisocyanatodiphenylmethane, 1,5-diisocyanaton-aphthalene or any desired mixtures of such diisocyanates.

The substances in question are preferably polyisocyanates or polyisocyanate mixtures of the stated type containing exclusively aliphatically and/or cycloaliphatically bonded isocyanate groups. Particularly preferred starting components (A1) are polyisocyanates or polyisocyanate mixtures based on HDI, IPDI and/or 4,4'-diisocyanatodicyclohexylmethane.

Further of suitability as polyisocyanates (A1) are any desired polyisocyanates which are synthesized from at least two diisocyanates, are prepared by modifying simple aliphatic, cycloaliphatic, araliphatic and/or aromatic diisocyanates, and have a uretdione, isocyanurate, urethane, allophanate, biuret, iminooxadiazine-dione and/or oxadiazinetrione structure, such as are described, for example, in J. Prakt. Chem. 336 (1994), pp. 185-200.

Suitable compounds containing NCO-reactive groups are polyols and/or polyamines (A2) which possess an average molecular weight $M_n$ from 400 to 6000 g/mol, preferably from 600 to 2500 g/mol. Their OH number and/or NH number is generally from 22 to 400 mg KOH/g, preferably from 50 to 200 mg KOH/g, and their OH and/or NH functionality is greater than or equal to 1.6, preferably from 2 to 4. Examples of such polyols are polyetherpolyols, polyesterpolyols, polycarbonatepolyols, polyestercarbonatepolyols, polyesteramidepolyols, polyamidepolyols, epoxy resin polyols and their reaction products with $CO_2$, poly(meth)acrylatepolyols, polyacetalpolyols, saturated and unsaturated, unfluorinated or fluorinated hydrocarbon-polyols and polysiloxanepolyols. Of these polyols the polyether-, polyesterpolyols and polycarbonatepolyols are preferred, particular preference being given to those which have only terminal OH groups and which possess a functionality of greater than or equal to 1.6, preferably from 2 to 4.

Instead of OH groups the compounds of component (A2) may also contain, proportionally or exclusively, primary or secondary amino groups as NCO-reactive groups.

Suitable polyetherpolyols are the polytetramethylene glycol polyethers which are known per se in polyurethane chemistry and can be prepared, for example, by polymerizing tetrahydrofuran by means of cationic ring openings. Polyetherpolyols suitable additionally are, for example, the polyols prepared, using starter molecules, from ethylene oxide, styrene oxide, propylene oxide, butylene oxide or epichlorohydrin, and also copolymers of the stated cyclic monomers.

Suitable polyesterpolyols of the known polycondensates of di- and also, where appropriate, poly(tri,tetra)ols and di- and also, where appropriate, poly(tri,tetra)-carboxylic acids or hydroxycarboxylic acids or lactones. Instead of the free polycarboxylic acids it is also possible to use the corresponding polycarboxylic anhydride or corresponding polycarboxylic esters of lower alcohols to prepare the polyesters.

Examples of suitable diols are ethylene glycol, butylene glycol, diethylene glycol, triethylene glycol, polyalkylene glycols such as polyethylene glycol, and also propanediol, butane-1,4-diol, hexane-1,6-diol, neopentyl glycol or neopentyl glycol hydroxypivalate. If desired it is possible as well to use polyols are such as, for example, trimethylolpropane, glycerol, eythritol, pentaerythritol, trimethylolbenzene or trishydroxyethylisocyanurate.

Examples of suitable dicarboxylic acids include phthalic acid, isophthalic acid, terephthalic acid, tetrahydrophthalic acid, hexahydrophthalic acid, cyclohexane-dicarboxylic acid, adipic acid, azelaic acid, sebacic acid, glutaric acid, tetrachloro-phthalic acid, maleic acid, fumaric acids, itaconic acid, malonic acid, suberic acid, 2-methylsuccinic acid, 3,3-diethylgiutaric acid and 2,2-dimethyl-succinic acid. The possible anhydrides of these acids are likewise suitable. For the purposes of the present invention, consequently, the anhydrides are embraced by the expression "acid". It is also possible to use monocarboxylic acids, such as benzoic acid, hexanecarboxylic acid or fatty acids, provided that the average functionality of the polyol is greater than 2. Saturated aliphatic or aromatic acids are preferred, such as adipic acid or isophthalic acid. In smaller amounts it is possible to use polycarboxylic acids such as trimellitic acid. Examples of hydroxycarboxylic acids, which can be used as reactants when preparing a polyesterpolyol having a terminal hydroxyl group, include hydroxycaproic acid, hydroxybutyric acid, hydroxy-decanoic acid or hydroxystearic acid. Examples of suitable lactones include ε-caprolactone or butyrolactone.

The hydroxyl-containing polycarbonates that are suitable are obtainable by reacting carbonic acid derivatives, e.g. diphenyl carbonate, dimethyl carbonate or phosgene, with diols. Examples of suitable such diols include ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trime-thylpentane-1,3-diol, dipropylene glycol, polypropylene glycols, dibutylene glycol, polybutylene glycols, bisphenol A, tetrabromobisphenol A but also lactone-modified diols. The diol component preferably contains from 40 to 100% by weight of hexanediol, preferably 1,6-hexanediol and/or hexanediol derivatives, with particular preference to those which in addition to terminal OH groups contain ether groups or ester groups. The hydroxyl polycarbonates are preferably linear. They can, however, have a low level of branching where appropriate through the incorporation-of polyfunctional components, especially low molecular mass polyols. Examples of compounds suitable for this purpose include glycerol, trimethylolpropane, hexane-1,2,6-triol, butane-1,2,4-triol, trimethylolpropane, pentaerythritol, quinitol, marinitol and sorbitol, methyl glycoside or 1,3,4,6-dianhydrohexitols.

Components (A3) serves to hydrophilicize the polyurethane. The dispersibility of the PU-PAC hybrid polymer can take place both by way of the polyurethane and by way of the polyacrylate. Examples of ionic or potentially ionic compounds suitable as component (A3) include mono- and dihydroxycarboxylic acids, mono- and diaminocarboxylic acids, mono- and dihydroxysulphonic acids, mono- and diaminosulphonic acids and also mono- and dihydroxyphosphonic acids and/or mono- and diaminophosphonic acids and their salts such as dihydroxycarboxylic acids, hydroxypivalic acid, N-(2-aminoethyl)-β-alanine, 2-(2-aminoethylamino)-ethanesulphonic acid, ethylenediamine-propyl- or -butylsulphonic acid, 1,2- or 1,3-propylenediamine-β-ethylsulphonic acid, lysine, 3,5-diaminobenzoic acid, the hydrophilicizing agent from Example 1 of EP 0 916 647 A1 and the alkali metal- and/or ammonium salts thereof; the adduct of sodium bisulphite with but-2-ne-1,4-diol, polyethersulphonate, the propoxylated adduct of 2-Butenediol and NaHSO3 (e.g. in DE 2 446 440 A1, page 5-9, formula I-III) and also building blocks which can be converted into cationic groups such as N-methyldiethanolamine as hydrophilic synthesis components. Preferred ionic or potential ionic compounds (A3) are those which possess carboxyl or carboxylate- and/or sulphonate groups. Particularly preferred ionic compounds (A3) are dihydroxy-carboxylic acids, with very particular preference α,α-dimethylolalkanoic acids, such as 2,2-dimethylolacetic acid, 2,2-dimethylolpropionic acid, 2,2-dimethylol-butyric acid, 2,2-dimethylolpentanoic acid or dihydroxysuccinic acid.

Additionally as component (A3) it is also possible to use nonionically hydrophilicizing compounds, e.g. polyoxyalkylene ethers containing at least one hydroxyl or amino group. These polyethers contain a fraction of from 30% by weight to 100% by weight of building blocks derived from ethylene oxide. They suitably include polyethers of linear construction with a functionality of between 1 and 3, but also compounds of the general formula (F-I):

(F-I)

in which $R^1$ and $R^2$ independently of one another are each a divalent aliphatic, cycloaliphatic or aromatic radical having 1 to 18 carbon atoms which can be interrupted by oxygen and/or nitrogen atoms, and $R^3$ is a non-hydroxy-terminated polyester or, preferably, polyether, more preferably an alkoxy-terminated polyethylene oxide radical.

The low molecular mass NCO-reactive compounds (A4) to be used optionally for the synthesis of the polyurethane (A) generally have the effect of stiffening the polymer chain. They generally possess a molecular weight of from about 62 to 400, preferably from 62 to 200, and can contain aliphatic, alicyclic or aromatic groups.

Examples are:
a) alkanediols and -polyols, such as ethanediol, 1,2- and 1,3-propanediol, 1,4- and 2,3-butanediol, 1,5-pentanediol, 1,3 dimethylpropanediol, 1,6-hexanediol, neopentyl glycol, cyclohexanedimethanol, 2-methyl-1,3-propanediol, bisphenol A (2,2-bis(4-hydroxyphenyl)propane), hydrogenated Bisphenol A (2,2-bis(4-hydroxycyclohexyl)propane), trimethylolpropane, glycerol or pentaerythritol, b) ether diols, such as diethylene diglycol, triethylene glycol or hydroquinone dihydroxyethyl ether, c) ester diols of the general formulae (F-II) and (F-III),

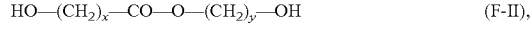

$$HO-(CH_2)_x-CO-O-(CH_2)_y-OH \qquad (F\text{-}II),$$

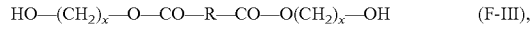

$$HO-(CH_2)_x-O-CO-R-CO-O(CH_2)_x-OH \qquad (F\text{-}III),$$

in which R is an alkylene or arylene radical having 1 to 10 carbon atoms, preferably 2 to 6 carbon atoms, x=2 to 6 and y=3 to 5, such as δ-hydroxybutyl-ε-hydroxycaproic esters, ω-hydroxyhexyl-γ-hydroxybutyric esters, (β-hydroxyethyl) adipate and bis(β-hydroxyethyl) terephthalate and d) di- and polyamines such as ethylene diamine, 1,2- and 1,3-diaminopropane, 1,4-diaminobutane, 1,6-diaminohexane, isophoronediamine, isomer mixture of 2,2,4- and 2,4,4-trimethylhexamethylenediamine, 2-methylpentam-ethylenediamine, diethylenetriamine, 1,3- and 1,4-xylylenediamine, α,α,α',α'-tetramethyl-1,3- and -1,4-xylylenediamine and 4,4-diaminodicyclohexylmethane. Also understood as diamines in the sense of the invention are hydrazine, hydrazine hydrate and substituted hydrazines, such as N-methylhydrazine, N,N'-dimethylhydrazine and homologues thereof and also acid dihydrazides, such as adipic dihydrazide, semicarbazidoalkylene hydrazides, such as β-semicarbazidopropionic hydrazide, semicarbazidoalkylene carbazine esters, such as 2-semicarbazidoethyl carbazine esters or else aminosemicarbazide compounds, such as β-aminoethyl semicarbazidocarbonate.

The polyurethane component (A) may also include building blocks (A5) which are located in each case at the chain ends and cap them. These building blocks are derived on the one hand from monofunctional, NCO-reactive compounds, such as monoamines, preferably from mono-secondary amines or monoalcohols. Mention may be made here, by way of example, of methylamine, ethylamine, propylamine, butylamine, octylamine, laurylamine, stearylamine, isononyloxypropylamine, dimethylamine, diethylamine, dipropylamine, dibutylamine, n-methylamino-propylamine diethyl (methyl)aminopropylamine, morpholine, piperidine or their suitable substituted derivatives, amide amines formed from diprimary amines and monocarboxylic acids, monoketimes of diprimary amines, primary/tertiary amines, such as N,N-dimethylaminopropylamine.

Preferred for (A5) are those compounds which contain active hydrogen having different reactivity towards NCO groups, such as compounds which contain secondary amino groups as well as a primary amino group or contain COOH groups as well as an OH group or contain OH groups as well as an amino group (primary or secondary), the latter compounds being particularly preferred. Examples thereof are primary/secondary amines, such as 3-amino-1-methylaminopropane 3-amino-1-ethylaminopropane, 3-amino-1-cyclohexyl-aminopropane, 3-amino-1-methylaminobutane, mono-hydroxycarboxylic acids, such as hydroxyacetic acid, lactic acid or malic acid, and also alkanolamines such as N-aminoethylethanolamine, ethanolamine, 3-aminopropanol, neopentanolamine and, with particular preference, diethanolamine. In this way functional groups are introduced additionally into the polymeric end product.

The polyurethane (A) can be prepared, for example, by first preparing an isocyanate-functional prepolymer and in a second reaction step, by reaction with compounds (A4) and/or (A5) obtaining an OH-functional compound.

The polyurethane resin (A) is preferably prepared by first preparing, from the polyisocyanates (A1), the polyols (A2) and the low molecular mass polyols (A4) and also, where appropriate, the compounds (A3), a polyurethane prepolymer containing on average per molecule at least 1.7, preferably from 2 to 2.5 free isocyanate groups, then reacting this prepolymer with compounds (A4) and/or (A5) in a non-aqueous system to give an NCO-free polyurethane resin (A). The polyurethane (A) is prepared preferably in the presence of at least a portion of the free-radically polymerizable monomers (B) which carry no isocyanate-reactive groups.

Alternatively the preparation can take place such that the polyurethane resin (A) is formed directly by reaction of components (A1) to (A5). Any anionic groups present in the polyurethane (A) can be neutralized, at least proportionally, with bases before or after the vinyl polymerization or else during the dispersing step with water.

Free-radically polymerizable vinyl monomers are selected from at least one of the group containing:
(B1) acid-functional polymerizable monomers,
(B2) hydroxy- and/or NH-functional polymerizable monomers,
(B3) further polymerizable monomers different from (B1) and (B2)

Overall the PU-PAC hybrid polymer is internally hydrophilicized. This hydrophilicization can take place by way of the polyurethane (A), by using component (A3) and/or the polyacrylate moiety, by using component (B1). Preferably the polyacrylate moiety is hydrophilicized.

Component (B1) suitably includes unsaturated free-radically polymerizable compounds having carboxyl/carboxylate groups or sulphonic acid/sulphonate groups. Examples of such acid-functional monomers (B1) are, for example, acrylic acid, methacrylic acid, β-carboxyethyl acrylate, crotonic acid, fumaric acid, maleic acid (anhydride), itaconic acid, monoalkyl esters of dibasic acids/anhydrides such as maleic monoalkyl esters, for example, and also the olefinically unsaturated monomers which contain sulphonic acid/sulphonate groups and are described in WO-A 00/39181 (p. 8 line 13-p. 9 line 19), among which 2-acrylamido-2-methylpropanesulphonic acid may be mentioned by way of example. It is preferred to use carboxy-functional monomers, with particular preference acrylic acid and/or methacrylic acid.

Component (B2) suitably includes in principle all OH- or NH-functional monomers containing free-radically polymerizable C=C double bonds. Preference is given here to hydroxy-functional monomers. Examples of suitable hydroxy-functional monomers (B2) are hydroxyethyl methacrylate, hydroxypropyl methacrylate, hydroxyethyl acrylate, hydroxypropyl acrylate, hydroxybutyl acrylate, hydroxybutyl methacrylate or hydroxy monomers containing alkylene oxide units, such as adducts of ethylene oxide, propylene oxide or butylene oxide with (meth)acrylic acid, (meth)acrylic hydroxy esters or (meth)allyl alcohol, and also the monoallyl and diallyl ethers of trimethylolpropane, glycerol or pentaerythritol. Particular preference is given to hydroxyethyl acrylate, hydroxyethyl methacrylate, hydroxypropyl acrylate, hydroxypropyl methacrylate, hydroxybutyl acrylate or hydroxybutyl methacrylate.

Examples of suitable monomers (B3) are (meth)acrylic esters with C1 to C18 hydrocarbon radicals in the alcohol moiety, examples being methyl acrylate, ethyl acrylate, n-butyl acrylate, isobutyl acrylate, tert-butyl acrylate, 2-ethylhexyl acrylate, methyl methacrylate, ethyl methacrylate, butyl methacrylate, 2-ethylhexyl methacrylate, hexyl acrylate, lauryl acrylate, monomers containing cyclic hydrocarbon radicals such as cyclohexyl (meth)acrylate, cyclohexyl (meth)acrylates substituted on the ring by alkyl groups, isobornyl (meth)acrylate or norbornyl (meth)acrylate, monomers containing aromatic groups such as styrene, vinyltoluene or α-methylstyrene, but also vinyl esters, vinyl monomers containing alkylene oxide units such as, for example, condensation products of (meth)acrylic acid with oligoalkylene oxide monoalkyl ethers and also monomers with further functional groups such as epoxy groups, alkoxysilyl groups, urea groups, urethane groups, amide groups or nitrile groups, for example. Additionally, (meth)acrylate monomers and/or vinyl monomers with a functionality of two or more, such as hexanediol di(meth)acrylate, ethylene glycol diacrylate, for example, can be used in amounts of 0-5% by weight, preferably 0-2% by weight based on the sum of the monomers (B1) to (B3). Preference is given to using methyl methacrylate, n-butyl acrylate, n-butyl methacrylate, 2-ethylhexyl acrylate, isobornyl acrylate, isobornyl methacrylate or styrene.

Suitable initiators for the polymerization reaction include organic peroxides such as di-tert-butyl peroxide or tert-butyl peroxy-2-ethylhexanoate and also azo compounds. The amounts of initiator used depend on the desired molecular weight. For reasons of process reliability and of greater ease of handling it is possible also to use peroxide initiators as a solution in suitable organic solvents of the type described in more detail below.

These aqueous hybrid dispersions are prepared by polymerizing components (B1) to (B3) and also the initiator component and, where appropriate, additional organic cosolvents in the presence of the solution or melt of the polyurethane (A), and the polyurethane-polyacrylate hybrid polymer is formed. The free-radical polymerization can be conducted in organic phase by polymerization techniques known per se in paint chemistry.

The weight-average molecular weight $M_w$ of the polyurethane-polyacrylate hybrid polymers is generally ≥1000 g/mol to ≤50000 g/mol and preferably between ≥2000 g/mol and ≤30000 g/mol. The OH content of the hybrid polymers in 100% form is from ≥1 to ≤10% by weight, preferably from ≥2.5 to ≤8% by weight. The acid group content, which constitutes the sum of carboxyl/carboxylate and sulphonic acid/sulphonate groups, of the hybrid polymers in 100% form is from ≥10 to ≤90 meq/100 g, preferably from 15 to 70 meq/100 g.

In another embodiment of the use according to the invention the polyurethane dispersion comprises:
I) hydroxyl-free polyurethanes and/or polyurethane-ureas and/or
II) ionically modified, hydroxyl- and/or amino-containing polyurethanes and/or polyurethane-ureas, and
III) at least one crosslinker, wherein the components (I) and (II) comprise polycarbonate polyols which have at least 25% by weight of 1,4-butanediol as a synthesis component.

In the non-functional PU polymers (I), the synthesis components are preferably selected from the group of components:
AA1) polyisocyanates,
AA2) polymeric polyols having a number-average molecular weight of $M_n$ 200 to 8000 g/mol, which comprise polycarbonate polyols having at least 25% by weight of 1,4-butanediol as synthesis component
AA3) low molecular weight compounds of molar weight $M_n$ 62 to 400 g/mol possessing in total two or more hydroxyl and/or amino groups,
AA4) compounds possessing one hydroxyl or amino group, AA5) isocyanate-reactive, ionic or potentially ionic compounds, and AA6) isocyanate-reactive, nonionic, hydrophilic compounds.

Suitable polyisocyanates of component AA1) are the aromatic, araliphatic, aliphatic or cycloaliphatic polyisocyanates which are known per se to the skilled person, have an NCO functionality of preferably ≥2 and may also contain iminooxadiazinedione, isocyanurate, uretdione, urethane, allophanate, biuret, urea, oxadiazinetrione, oxazolidinone, acylurea and/or carbodiimide structures. They may be used individually or in any desired mixtures of one another.

Examples of suitable polyisocyanates are hexamethylene diisocyanate (HDI), isophorone diisocyanate (IPDI), the isomeric dicyclohexylmethane 4,4'-diisocyanate or mixtures thereof with any desired isomer content and 1,4-cyclohexyl diisocyanate.

An example of a non-modified polyisocyanate having more than 2 NCO groups per molecule that may be mentioned is, for example, 4-isocyanatomethyl-1,8-octane diisocyanate (nonane triisocyanate).

Preference is given to polyisocyanates or polyisocyanate mixtures of the aforementioned kind that contain exclusively aliphatically and/or cycloaliphatically attached isocyanate groups.

Particular preference is given to hexamethylene diisocyanate, isophorone diisocyanate, the isomeric dicyclohexylmethane 4,4'-diisocyanate and also mixtures thereof.

Hydroxyl-containing polycarbonate polyols meeting the definition of component AA2) are obtainable by reacting carbonic acid derivatives, e.g. diphenyl carbonate, dimethyl carbonate or phosgene, with diols. The hydroxyl-functional poly-carbonate polyols AA2) to be used according to the invention have an average hydroxyl functionality of 1.6 to 4, preferably 1.8 to 3, and more preferably 1.9 to 2.3 and a number-average molecular weight of 240 to 8000 g/mol, preferably of 500 to 3000 g/mol, more preferably of 750 to 2500 g/mol. The polycarbonate polyols are preferably prepared according to the preparation process described in EP 1 404 740 A1 (pp. 6-8, Examples 1-6) and EP 1 477 508 A1 (p. 5, Example 3).

Examples of suitable diols include 1,3- and 1,4-butanediol, 1,6-hexanediol, 1,8-octanediol, 1,12-dodecanediol, neopentyl glycol, 1,4-bishydroxymethylcyclohexane, 2-methyl-1,3-propanediol and trimethylpentane-1,3-diol, the fraction of 1,4-butanediol being at least 25% by weight of the diol components used.

Preferably the diol component contains 45% to 100% by weight of 1,4-butanediol and 0% to 55% by weight of 1,6-hexanediol, more preferably 60% to 100% by weight of 1,4-butanediol and 0% to 40% by weight of 1,6-hexanediol.

The hydroxyl polycarbonates are preferably linear, but may also be branched where appropriate as a result of the incorporation of polyfunctional components, particularly low molecular weight polyols.

Particularly preferred components AA2) are based on mixtures of 1,4-butanediol and 1,6-hexanediol and have an average hydroxyl functionality of 1.9 to 2.05.

Polyester polyols which have a molecular weight $M_n$ of 400 to 6000 g/mol, more preferably of 600 to 3000 g/mol, can likewise be used by way of example as polymeric polyols AA2). Their hydroxyl number is generally 22 to 400 mg KOH/g, preferably 50 to 200 mg KOH/g and more preferably 80 to 160 mg KOH/g, and they have an OH functionality of 1.5 to 6, preferably of 1.8 to 4 and more preferably of 1.9 to 3.3.

Highly suitable examples are the conventional polycondensates of diols and also optionally polyols and dicarboxylic and also optionally polycarboxylic acids or hydroxycarboxylic acids or lactones. Instead of the free polycarboxylic acids it is also possible to use the corresponding polycarboxylic anhydrides or corresponding polycarboxylic esters of lower alcohols to prepare the polyesters. Examples of suitable diols are ethylene glycol, butane-1,4-diol, hexane-1,6-diol, neopentyl glycol. As polyols for optional use as well, mention may be made here, for example, of trimethylolpropane, glycerol or pentaerythritol.

Preferred suitable dicarboxylic acids include phthalic acid, isophthalic acid, terephthalic acid, tetrahydrophthalic acid, hexahydrophthalic acid, or adipic acid. Anhydrides of these acids are also suitable, where they exist. For the purposes of the present invention, consequently, the anhydrides are embraced by the term "acid". Monocarboxylic acids as well, such as benzoic acid and hexanecarboxylic acid, can be used provided that the average functionality of the polyol is greater than 2. As a polycarboxylic acid which can also be used optionally, in relatively small amounts, mention may be made here of trimellitic acid.

Further suitable components AA2) are the polylactone and polyether polyols known from polyurethane chemistry, insofar as they correspond to the abovementioned criteria with respect to functionality and molecular weight.

The fraction of the hydroxypolycarbonates in the sum of the polyols from AA2) used to prepare the polymers (I) and (II), respectively, is 35 to 100% by weight, preferably 45 to 100% by weight and more preferably 65 to 100% by weight.

The low molecular weight polyols AA3) that are used for synthesizing the polyurethane resins generally have the effect of a stiffening and/or a branching of the polymer chain. The molecular weight is preferably situated between 62 and 200 g/mol. Suitable polyols may contain aliphatic, alicyclic or aromatic groups. Mention may be made here, by way of example, of the low molecular weight polyols having up to about 20 carbon atoms per molecule, such as ethylene glycol, diethylene glycol, 1,4-butanediol, 1,3-butylene glycol, cyclohexanediol, 1,4-cyclohexanedimethanol, 1,6-hexanediol, and also trimethylolpropane, glycerol or pentaerythritol.

Diamines or polyamines and also hydrazides can likewise be used as AA3), examples being ethylenediamine, 1,2- and 1,3-diaminopropane, 1,4-diaminobutane, 1,6-diaminohexane, isophoronediamine, an isomer mixture of 2,2,4- and 2,4,4-trimethylhexamethylenediamine, 2-methylpentamethylenediamine, diethylenetriamine, 1,3- and 1,4-xylylenediamine, α,α,α',α'-tetramethyl-1,3- and -1,4-xylylenediamine and 4,4-diaminodicyclohexylmethane, dimethylethylenediamine, hydrazine or adipic dihydrazide. Suitability as AA3) is also possessed in principle by compounds containing active hydrogen with a different reactivity towards NCO groups, such as compounds which in addition to a primary amino group also contain secondary amino groups or in addition to an amino group (primary or secondary) also contain OH groups.

The polyurethane resins I) and II) may also, where appropriate, include units AA4), which in each case are located at the chain ends and finish the said ends. These units are derived on the one hand from monofunctional compounds reactive towards NCO groups, such as monoamines, particularly mono-secondary amines or monoalcohols.

By ionically and potentially ionically hydrophilicizing compounds AA5) are meant all compounds which contain at least one isocyanate-reactive group and also at least one functionality, such as —COOY, —SO$_3$Y, —PO(OY)$_2$ (Y for example=H, NH$_4^+$, metal cation), —NR$_2$, —NR$_3^+$ (R=H, alkyl, aryl), which on interaction with aqueous media enters into a pH-dependent dissociation equilibrium and in that way can have a negative, positive or neutral charge. Preferred isocyanate-reactive groups are hydroxyl or amino groups.

Suitably ionically or potentially ionically hydrophilicizing compounds meeting the definition of component AA5) are, for example, mono- and dihydroxycarboxylic acids, mono- and diaminocarboxylic acids, mono- and dihydroxysulphonic acids, mono- and diaminosulphonic acids and also mono- and dihydroxyphosphonic acids or mono- and diaminophosphonic acids and their salts such as dimethylolpropionic acid, dimethylolbutyric acid, hydroxypivalic acid, N-(2-aminoethyl)-β-alanine, 2-(2-aminoethylamino)ethanesulphonic acid, ethylenediaminepropylsulphonic or -butylsulphonic acid, 1,2- or 1,3-propylenediamine-.β.-ethylsulphonic acid, malic acid, citric acid, glycolic acid, lactic acid, glycine, alanine, taurine, lysine, 3,5-diaminobenzoic acid, an adduct of aliphatic diamines such as, for example, ethylenediamine (EDA) or isophoronediamine, IPDA and acrylic acid (EP 0 916 647 A1, example 1) and the alkali metal and/or ammonium salts thereof; the adduct of sodium bisulphite with but-2-ene-1,4-diol, polyethersulphonate, the propoxylated adduct of 2-butenediol and NaHSO3, described for example in DE 2 446 440 A1 (page 5-9, formula I-III), and compounds which contain units which can be converted into cationic groups, amine-based units for example, such as N-methyldiethanolamine, as hydrophilic synthesis components. It is additionally possible to use cyclohexylaminopropanesulphonic acid (CAPS) such as in WO 01/88006 A1, for example, as a compound meeting the definition of component AA5).

To synthesize the component (I), preferred compounds AA5) are those which possess carboxyl or carboxylate and/or sulphonate groups and/or ammonium groups. Particularly preferred ionic compounds AA5) are those containing carboxyl and/or sulphonate groups as ionic or potentially ionic groups, such as the salts of N-(2-aminoethyl)-β-alanine, of 2-(2-aminoethylamino)ethanesulphonic acid or of the adduct of IPDI and acrylic acid (EP 0 916 647 A1, example 1) and also of dimethylolpropionic acid.

Suitable non-ionically hydrophilicizing compounds meeting the definition of component AA6) are, for example, polyoxyalkylene ethers which contain at least one hydroxyl or amino group. These polyethers include a fraction of 30% to 100% by weight of units derived from ethylene oxide.

The polyalkylene oxide polyether alcohols are either straight polyethylene oxide polyethers or mixed polyalkylene oxide polyethers at least 30 mol %, preferably at least 40 mol %, of whose alkylene oxide units are composed of ethylene oxide units. Preferred non-ionic compounds are monofunctional mixed polyalkylene oxide polyethers containing at least 40 mol % ethylene oxide units and not more than 60 mol % propylene oxide units.

For the PU polymers (I) it is preferred to use a combination of ionic and non-ionic hydrophilicizing agents meeting the definitions of components AA5) and AA6). Particularly preferred combinations are those of non-ionic and anionic hydrophilicizing agents.

It is preferred to use 5% to 45% by weight of component AA1), 50% to 90% by weight of component AA2), 1% to 30% by weight of the sum of compounds AA3) and AA4), 0 to 12% by weight of component AA5), 0 to 15% by weight of component AA6), the sum of AA5) and AA6) being 0.1% to 27% by weight and the sum of all components adding to 100% by weight.

It is particularly preferred to use 10% to 40% by weight of component AA1), 55% to 85% by weight of component AA2), 1% to 25% by weight of the sum of compounds AA3) and AA4), 0 to 10% by weight of component AA5), 0 to 10% by weight of component AA6), the sum of AA5) and AA6) being 0.1% to 20% by weight and the sum of all components adding to 100% by weight.

Very particular preference is given to using 15% to 40% by weight of component AA1), 60% to 85% by weight of component AA2), 1% to 20% by weight of the sum of compounds AA3), 0 to 8% by weight of component AA5), 0 to 10% by weight of component AA6), the sum of AA5) and AA6) being 0.1% to 18% by weight and the sum of all components adding to 100% by weight.

The process for preparing the aqueous PU dispersion (I) can be carried out in one or more stages in homogenous phase or, in the case of multi-stage reaction, partly in disperse phase. Following complete or partial polyaddition of AA1)-AA6) there is a dispersing, emulsifying or dissolving step. This is followed optionally by a further polyaddition or modification in disperse phase.

The aqueous PU dispersions (I) can be prepared using all of the prior art methods, such as the prepolymer mixing method, acetone method or melt dispersing method, for example. The PU dispersion (I) is prepared preferably by the acetone method.

The solids content of the PU dispersion (I) is generally 25% to 65%, preferably 30% to 60% and more preferably 40% to 60%.

The ionically modified, hydroxyl-containing polyurethanes and/or polyurethane-ureas (II) contain 5% to 45% by weight of component AA1), 50% to 94.5% by weight of components AA2), 0% to 15% by weight of component AA3), 0.5% to 12% by weight of component AA5), 0% to 15% by weight of component AA6), the sum of all components adding up to 100% by weight.

The ionically modified, hydroxyl-containing polyurethanes and/or polyurethane-ureas (II) preferably contain 7.5% to 35% by weight of component AA1), 60% to 90% by weight of components AA2), 0% to 10% by weight of components AA3), 2.5% to 7.5% by weight of component AA5), 0% to 12.5% by weight of component AA6), the sum of all components adding up to 100% by weight.

The ionically modified, hydroxyl-containing polyurethanes and/or polyurethane-ureas (II) very preferably contain 10% to 25% by weight of component II.1), 65% to 85% by weight of components AA2), 1.5% to 5% by weight of component AA3), 3% to 7% by weight of component AA5), 0% to 10% by weight of component AA6), the sum of all components adding up to 100% by weight.

Suitable components AA3) are only compounds which are OH-functional. Components AA4) are not used for the synthesis of polymers (II).

The ionically modified, hydroxyl-containing polyurethanes and/or polyurethane-ureas (II) preferably feature purely ionic hydrophilicization in accordance with the definition of components AA5). These coating materials comprise the ionically modified, hydroxyl-containing polyurethanes and/or polyurethane-ureas (II), which in the course of preparation are either converted into the aqueous form, and are therefore present as a dispersion, or alternatively are present as a solution in an optionally water-miscible solvent which is inert towards isocyanate groups.

The ionically modified, hydroxyl-containing polyurethanes and/or polyurethane-ureas (II) can be prepared by the customary prior art processes. The polyurethanes and/or polyurethane-ureas (II) differ from the PU polymers (I) in particular in the type of preparation and the type of hydrophilicizing. They contain carboxylic acid groups and/or sulphonic acid groups, preferably carboxylic acid groups, which may have been at least fractionally neutralized, as hydrophilic groups. For the preparation of the PU polymers (II) preference is therefore given as component AA5) to those possessing carboxyl and/or carboxylate groups. Particularly preferred ionic compounds AA5) are dihydroxycarboxylic acids, with especial preference being given to α,α-dimethylolalkanoic acids, such as 2,2-dimethylolpropionic acid, 2,2-dimethylolbutyric acid or dihydroxysuccinic acid, for example.

To prepare the ionically modified, hydroxyl-containing polyurethanes and/or polyurethane-ureas (II) it is usual to introduce, initially, components AA2), AA3), AA5) and optionally AA6), optionally together with a suitable catalyst and, where required, in an appropriate solvent, into a vessel. Added to this mixture at a temperature of 0 to 140° C., preferably 70 to 135° C. and more preferably at 90 to 130° C. is a polyisocyanate component AA1), after which the components are left to react until the reaction product is isocyanate-free. The amounts of components AA1) to AA6) employed are calculated such that for each equivalent of hydroxyl groups there is 0.45 to 0.95, preferably 0.55 to 0.90, more preferably 0.65 to 0.85 equivalent (eq) of isocyanate groups.

The preparation of the ionically modified, hydroxyl-containing polyurethanes and/or polyurethane-ureas (II) takes place preferably without the addition of organic solvents.

The acid groups incorporated in the prepolymer are at least fractionally neutralized. This can be done during or else after prepolymer preparation but also during or after dispersing in water, by adding suitable neutralizing agents (see also with regard to PU dispersion (I)). Examples of suitable neutralizing agents are triethylamine, triethanolamine, dimethylethanolamine, ethyldiisopropylamine or diisopropylethylamine. The neutralizing agent is generally used in a molar ratio with respect to the acid groups of the prepolymer of 0.3:1 to 1.3:1, preferably of 0.6:1 to 1.1:1.

Thereafter the hydroxyl-functional polyurethane is converted into an aqueous dispersion by addition of water or by introduction into water.

The resins of the PU polymers (II) that are obtainable in accordance with the procedure described above possess a number-average molecular weight $M_n$ of 1000 to 30 000 g/mol, preferably of 1500 to 10 000 g/mol, an acid number of 10 to 80, preferably of 15 to 40 mg KOH/g and a hydroxyl group content of 0.5% to 6% by weight, preferably of 1.0% to 4%.

The PU dispersions (I) and (II) may furthermore comprise all additives that are known for PU dispersions such as, for example, antioxidants, light stabilizers and/or other auxiliaries and additives as well as fillers.

Also present are crosslinkers (III). Depending on the choice of crosslinker it is possible to prepare both one-component paints and two-component paints. By one-component paints for the purposes of the present invention are meant coating compositions wherein binder component and crosslinker component can be stored together without a crosslinking reaction taking place to any marked extent or any extent detrimental to the subsequent application. By two-component paints are meant for the purposes of the present invention coating compositions wherein binder component and crosslinker component have to be stored in separate vessels owing to their high reactivity. The two components are mixed only shortly before application, when they react generally without additional activation. Examples of suitable crosslinkers (III) include blocked or non-blocked polyisocyanate crosslinkers, amide- and amine-formaldehyde resins, phenolic resins, aldehyde resins and ketone resins, such as for example phenol-formaldehyde resins, resoles, furan resins, urea resins, carbamate resins, triazine resins, melamine resins, benzoguanamine resins, cyanamide resins or aniline resins. Preference is given to polyisocyanates.

As crosslinker component (III) it is particularly preferred to use polyisocyanates having free isocyanate groups, since the resultant aqueous polyurethane paints display a particularly high level of paint properties. Examples of suitable crosslinkers (III) include paint polyisocyanates such as polyisocyanates containing uretdione, biuret, isocyanurate or iminooxadiazinedione groups and formed from hexamethylene diisocyanate, 1-isocyanato-3,3,5-trimethyl-5-isocyanatomethylcyclohexane or bis(4-isocyanatocyclohexane)methane.

The PU polymers (I) and (II) as described here are generally sufficiently hydrophilic, so that the dispersibility even of hydrophobic crosslinkers from component (III) is ensured. If desired, however, it is also possible to add external emulsifiers such as are known to the skilled person.

Additionally, however, it is also possible in component (III) to use water-soluble or dispersible polyisocyanates such as are obtainable, for example, by modification with carboxylate, sulphonate and/or polyethylene oxide groups and/or polyethylene oxide/polypropylene oxide groups.

Also possible in principle, of course, is the use of mixtures of different crosslinker resins of the aforementioned kind in component (III).

Likewise provided by the present invention is a process for preparing the aqueous coating materials of the invention, characterized in that the PU polymers (I) and also the PU polymers (II) are dispersed in water and mixed with the crosslinker (III).

The ratio of the crosslinker (III) to the compounds of components (II) that are reactive with it is to be chosen so as to result in a ratio of crosslinker-reactive groups from (II) (e.g. OH groups) to the reactive groups of the crosslinker (NCO groups in the case of isocyanates) of 0.5:1.0 to 3.5:1.0, preferably 1.0:1.0 to 3.0:1.0 and more preferably of 1.0:1.0 to 2.5:1.0.

The mixture of components (I) and (II) contains preferably 5% to 95% by weight (with respect to solid resin), more preferably 25% to 75% by weight (with respect to solid resin) of component (II), and the amount of (I) is to be chosen such that the total amounts of (I) and (II) add up to 100% by weight (with respect to solid resin).

As customary paint auxiliaries and additives, the substances known to the skilled person may be present in the coating materials of the invention, such as defoamers, wetting agents, thickeners, pigments, dispersing assistants, catalysts, anti-skinning agents, anti-settling agents and/or emulsifiers, and also additives which enhance the desired soft feel effect. The point in time during preparation at which the additives/auxiliaries are added to the coating materials of the invention or incorporated into them is unimportant.

Preferably the polycarbonate polyols contain ≥60% to ≤100% by weight of 1,4-butanediol and ≥0% to ≤40% by weight of 1,6-hexandiol as synthesis components, the sum of 1,4-butanediol and 1,6-hexanediol adding up to ≤100% by weight. It is also preferred that the polycarbonate polyols have an average hydroxyl functionality of ≥1.6 to ≤4.

In another embodiment of the use according to the invention the at least partially hydrophilicized polyisocyanate is an aliphatic polyisocyanate. Preferably the at least partially hydrophilicized polyisocyanate is based on 1,6-hexamethylene diisocyanate. The term "based on" is to be understood that 1,6-hexamethylene diisocyanate has been used in the reaction to form the polyisocyanate even if the NCO groups are partially converted into other functional groups such as isocyanurate groups or biuret groups in the course of the reaction.

The present invention further relates to a method of producing a coated wood surface, comprising the step of coating a wood surface with an aqueous preparation whose use has been recited as stated above.

Another aspect of the present invention is a coated wood surface comprising an aqueous preparation whose use has been recited as stated above.

The invention claimed is:

1. A method for coating a wood surface, comprising applying an aqueous preparation to the wood surface; wherein the aqueous preparation comprises:
≥20 weight-% to ≤50 weight-% of a hydroxyl-functional polyurethane-polyacrylate dispersion,
≥20 weight-% to ≤50 weight-% of a polyurethane dispersion comprising a hydroxyl-functional polyurethane,
≥5 weight-% to ≤20 weight-% of an at least partially hydrophilicized polyisocyanate and
≥0 weight-% to ≤10 weight-% of a matting agent,
wherein the combined hydroxyl content of the hydroxyl-functional polyurethane-polyacrylate dispersion and the polyurethane dispersion is ≥1% to ≤12%, and
wherein the hydroxyl-functional polyurethane-polyacrylate dispersion is a polyurethane-polyacrylate hybrid secondary dispersion prepared by a process comprising:
preparing a polyurethane solution (A) having an average molecular weight $M_n$ of ≥1100 g/mol to ≤10000 g/mol, which contains no polymerizable double bond, in a non-aqueous solution, optionally in the presence of an vinylically unsaturated monomer which carries no group that is reactive towards an isocyanate group,
adding to the polyurethane solution (A), one or more vinylically unsaturated monomers (B) at least one selected from the group consisting of (B1) acid-functional monomers, (B2) hydroxyl- and/or amino-functional monomers, and (B3) other monomers different from (B1) and (B2), to form a mixture,
subjecting the mixture to free-radical polymerization in a homogeneous, non-aqueous phase to provide a hybrid polymer,
neutralizing at least one neutralizable group, and
dispersing the hybrid polymer into the aqueous phase, wherein the neutralization can take place before or after the vinyl polymerization or during the dispersing step.

2. The method of claim 1, wherein the combined hydroxyl content of the hydroxyl-functional polyurethane-polyacrylate dispersion and the polyurethane dispersion is ≥1% to ≤10%.

3. The method of claim 1, wherein in the free-radical polymerization the fraction of the acid-functional monomers in the monomer mixture is higher at the end than at the beginning of the reaction.

4. The method of claim 1, wherein the polyurethane-polyacrylate hybrid polymer contains a hydroxyl group both in the polyurethane fraction (A) and in the vinylically unsaturated monomer fraction (B).

5. The method of claim 1, wherein the polyurethane dispersion comprises:
I) a hydroxyl-free polyurethane and/or polyurethane-urea and/or
II) an ionically modified, hydroxyl- and/or amino-containing polyurethane and/or polyurethane-urea, and
III) at least one crosslinker, identical or different from the at least partially hydrophilicized polyisocyanate,
wherein the components (I) and (II), comprise a polycarbonate polyol which has at least 25% by weight of 1,4-butanediol as a synthesis component.

6. The method of claim 5, wherein the polycarbonate polyol contains ≥60% to ≤100% by weight of 1,4-butanediol and ≥0% to ≤40% by weight of 1,6-hexanediol as synthesis components, the sum of 1,4-butanediol and 1,6-hexanediol adding up to ≤100% by weight.

7. The method of claim 5, wherein the polycarbonate polyol has an average hydroxyl functionality of ≥1.6 to ≤4.

8. The method of claim 1, wherein the at least partially hydrophilicized polyisocyanate is an aliphatic polyisocyanate.

9. The method of claim 8, wherein the at least partially hydrophilicized polyisocyanate is based on 1,6-hexamethylene diisocyanate.

10. A coated wood surface produced by the method of claim 1.

* * * * *